United States Patent [19]

Cheung et al.

[11] Patent Number: 5,442,498
[45] Date of Patent: Aug. 15, 1995

[54] ASYNCHRONOUS TRACK CODE ENCODEMENT AND DETECTION FOR DISK DRIVE SERVO CONTROL SYSTEM

[75] Inventors: Wayne L. Cheung; Chenhuei J. Chaing, both of San Jose; Thinh H. Nguyen, Sunnyvale, all of Calif.

[73] Assignee: International Business Machines Corporation, Armonk, N.Y.

[21] Appl. No.: 148,791

[22] Filed: Nov. 8, 1993

[51] Int. Cl.[6] .......................... G11B 5/596; G11B 5/09
[52] U.S. Cl. ................................... 360/77.08; 360/51;
360/77.02; 360/49; 360/48
[58] Field of Search ............... 360/77.08, 78.14, 49,
360/51, 47, 77.02, 77.06, 48; 369/59, 48, 47

[56] References Cited

U.S. PATENT DOCUMENTS

| | | | |
|---|---|---|---|
| 4,134,138 | 1/1979 | Cardot et al. | 360/39 |
| 4,209,810 | 6/1980 | Ragle et al. | 360/77.07 |
| 4,519,054 | 5/1985 | Jewer | 369/30 |
| 4,669,004 | 5/1987 | Moon et al. | 360/77.08 X |
| 4,823,212 | 4/1989 | Knowles et al. | 360/77.08 |
| 4,910,617 | 3/1990 | Brunnett et al. | 360/78.14 |
| 4,977,472 | 12/1990 | Volz et al. | 360/78.14 |
| 4,984,100 | 1/1991 | Takayama et al. | 360/49 |
| 5,050,016 | 9/1991 | Squires | 360/77.08 |
| 5,089,757 | 2/1992 | Wilson | 318/560 |
| 5,285,327 | 2/1994 | Hetzler | 360/77.08 |

OTHER PUBLICATIONS

D. Freitas, G. Herbst and M. Moser, "Asynchronous Quadrature Burst Position Error Demodulation Technique," IBM Technical Disclosure Bulletin, vol. 34, No. 5, Oct. 1991, pp. 406–407.

C. C. Liu, "Quad–Burst Servo Pattern," IBM Technical Disclosure Bulletin, vol. 22, No. 12, May 1980, pp. 5436–5438.

W. A. Herrington and F. E. Mueller, "Quad–Burst PES System for Disk File Servo," IBM Technical Disclosure Bulletin, vol. 21, No. 2, Jul. 1978, pp. 804–805.

Primary Examiner—Andrew L. Sniezek
Assistant Examiner—Varsha A. Kapadia
Attorney, Agent, or Firm—Baker, Maxham, Jester & Meador

[57] ABSTRACT

A disk head position control system having a disk head controller that moves a disk head relative to a surface of a magnetic media disk encoded with a plurality of tracks of a quadrature burst pattern includes a burst pattern that comprises an asynchronous, multi-frequency track address code having burst pattern transitions that extend across the width of a track and are arranged in staggered fashion in alternate tracks such that no transitions between adjacent tracks are aligned in the disk radial direction.

22 Claims, 5 Drawing Sheets

ASYNCHRONOUS TRACK CODE ENCODEMENT AND DETECTION FOR DISK DRIVE SERVO CONTROL SYSTEM

CROSS REFERENCE TO RELATED APPLICATION

This application is related to U.S. patent application entitled "Asynchronous Digital PES Demodulation Disk Drive Servo Control System" filed by Wayne Cheung, Chung C. Liu, and F. Edward Mueller, assigned to International Business Machines Corporation (IBM Corporation) and given application Ser. No. 08/156,531.

BACKGROUND OF THE INVENTION

1. Field of the Invention

This invention relates generally to disk drive servo control systems and, more particularly, to track code systems used by digital disk drive servo control systems to determine location of a read/write head relative to disk tracks.

2. Description of the Related Art

In conventional computer data storage systems having a rotating storage medium, data is stored in a series of concentric or spiral tracks across the surface of the disk. The storage medium can comprise, for example, a disk having a surface on which a magnetic material is deposited, such as conventional magnetic disks or magneto-optical disks. The data stored on a disk is represented as a series of variations in magnetic orientation of the disk magnetic material. The variations in magnetic orientation, generally comprising reversals of magnetic flux, represent binary digits of ones and zeroes that in turn represent data. The binary digits must be read from the disk surface by a magnetic head transducer suspended over the disk surface that can detect the variations in magnetic orientation as the disk rotates relative to the magnetic head at thousands of revolutions per minute and generate a fluctuating data signal.

Conventionally, the magnetic head is mounted on a disk arm that is moved by a servo. A disk drive servo control system controls movement of the arm across the surface of the disk to move the head from track to track and, once over a selected track, to maintain the magnetic head in a path over the centerline of the track. In a track seek operation, the magnetic head is moved over the disk to a desired one of the tracks. To accurately position the magnetic head at the desired track, it is necessary to determine the track number beneath the head as the disk rotates and the head is moved across the disk.

In general, the tracks of a data storage disk include track identification information fields containing data that is pre-recorded in the tracks. The track identification information fields include, for example, a track address field and a servo burst pattern field. The track identification information can be provided either as part of a dedicated servo system or as a sector servo system. In the dedicated servo method, the entire surface of one disk is recorded with track identification information. A dedicated servo magnetic head is positioned over the dedicated servo disk surface in a fixed relationship relative to one or more data read/write heads positioned over data disk surfaces. The position of the dedicated servo head is used to indicate the position of the data read/write heads. In the sector servo method, each disk surface includes both track identification information data and digital data. The track identification information and the digital data are both read by the same magnetic read/write head. The tracks on a sector servo disk surface are divided into radial sectors having short sector marker, track address, and servo burst pattern fields followed by a longer digital data field. The data in the sector marker field indicates to the read/write head that position information immediately follows in the track, while the data in the track address field indicates the track number, or address code, of the track.

The dedicated servo method is most often used with multiple disk data storage systems, because a dedicated servo system for a single disk application would use one-half of the available disk surface area for track identification information and therefore would not be especially efficient. The sector servo method is more efficient than the dedicated servo method for low profile drives with fewer disks in the configuration, because a single read/write head can be used to obtain the track identification information and to read and record digital data from the disk and also because less of the disk surface area is used for track identification information. As users demand greater storage capacities from disk systems, manufacturers provide less and less disk area for track identification information by decreasing sector length and track width. To obtain the same amount of track identification information in less disk area, the information must be recorded at higher and higher frequencies. The higher frequencies increase the difficulty of reading the track identification information.

Conventionally, the track address code data is encoded on a disk as a gray code, known to those skilled in the art, to assist in the correction of read errors due to off-track detection of adjacent track address data as a track identification information head is moved across the disk. The track address is encoded as a low frequency analog signal. The track identification information head, which can be the same head used for reading the digital data for a sector servo disk or can be a dedicated servo head, detects the track address data and produces an analog signal that is sent to a preamplifier. An automatic gain control circuit typically receives the preamplified signal and produces a signal with reduced dynamic range, which makes the signal easier to process and can thereby reduce errors. The analog signal is demodulated with peak detection circuitry to determine the ones and zeroes that specify a binary track address and such track data is provided to the disk drive servo control system circuitry to provide information on the track from which the servo position information was read.

A phase-lock-loop (PLL) circuit is usually required for high-frequency synchronous detection of the gray code track address information on the disk. The PLL helps reduce phase jitter, variations in signal amplitude, and off-track noise. The synchronous detection of the track address requires a synchronization field in the servo information areas of the disk to synchronize the PLL operation with the data storage device system clock. Unfortunately, the synchronization field reduces the disk area available for recording of data. In addition, the PLL can introduce processing errors that can require additional compensating circuit components, complicating the design and construction of the track address decoding circuitry.

In some disk drive data storage systems, the digital data is demodulated from the disk using digital processing methods. In such systems, separate analog and digital processing channels must be provided, so that the signal from the track identification information fields is provided to art analog data processing channel and the signal from the digital data fields is provided to a digital data processing channel. After the track address data is determined, it is known to digitize the track address data and provide it to digital control circuitry, but the track address demodulation still is performed by the analog circuitry. Providing separate data channels increases the complexity of the disk drive circuitry and increases the cost of producing disk drives.

The desire for increased storage capacity, resulting in what are commonly referred to as high density disk drive systems, also has resulted in new read/write head technologies. For example, magneto-resistive (MR) read/write heads are becoming more common because they permit reading of data at relatively high frequencies even with lower disk rotational velocity. The higher frequencies permit track identification information data, servo burst pattern data, and digital data to take up less disk space, increasing disk capacity. Unfortunately, the nonlinear response characteristics of MR read/write heads result in strong second-order harmonics in the digitized signal that can introduce extra errors in the resulting demodulated track address data, which can cause mistracking of the read/write head.

From the discussion above,, it should be apparent that there is a need for a disk drive with a track address encodement and detection scheme that reduces overall circuit complexity and accommodates narrow data tracks. The present invention fulfills this need.

SUMMARY OF THE INVENTION

In accordance with the present invention, a disk drive data storage device includes a position control system having an asynchronous digital disk head controller that moves a disk magnetic head relative to a surface of a magnetic media disk having tracks encoded with an asynchronous track address pattern that comprises a multi-frequency track address code having burst pattern transitions that extend across the width of a track and are arranged in staggered fashion in alternate tracks such that no transitions between adjacent tracks are aligned in a disk radial direction. The digital disk head controller permits the position control system to share signal processing components with a digital data channel processing system and eliminates the need for additional components, such as a phase-lock-loop, needed for synchronous; detection of track address data. The multi-frequency track address code permits track address data to be recorded at higher frequencies, reducing the disk area needed for track identification information fields. A disk drive having a position control system constructed in accordance with the present invention increases the accuracy of detecting the track address data and reduces the overall control circuit complexity.

Other features and advantages of the present invention should be apparent from the following description of the preferred embodiment, which illustrates, by way of example, the principles of the invention.

DESCRIPTION OF THE PREFERRED EMBODIMENT

Figure 1:
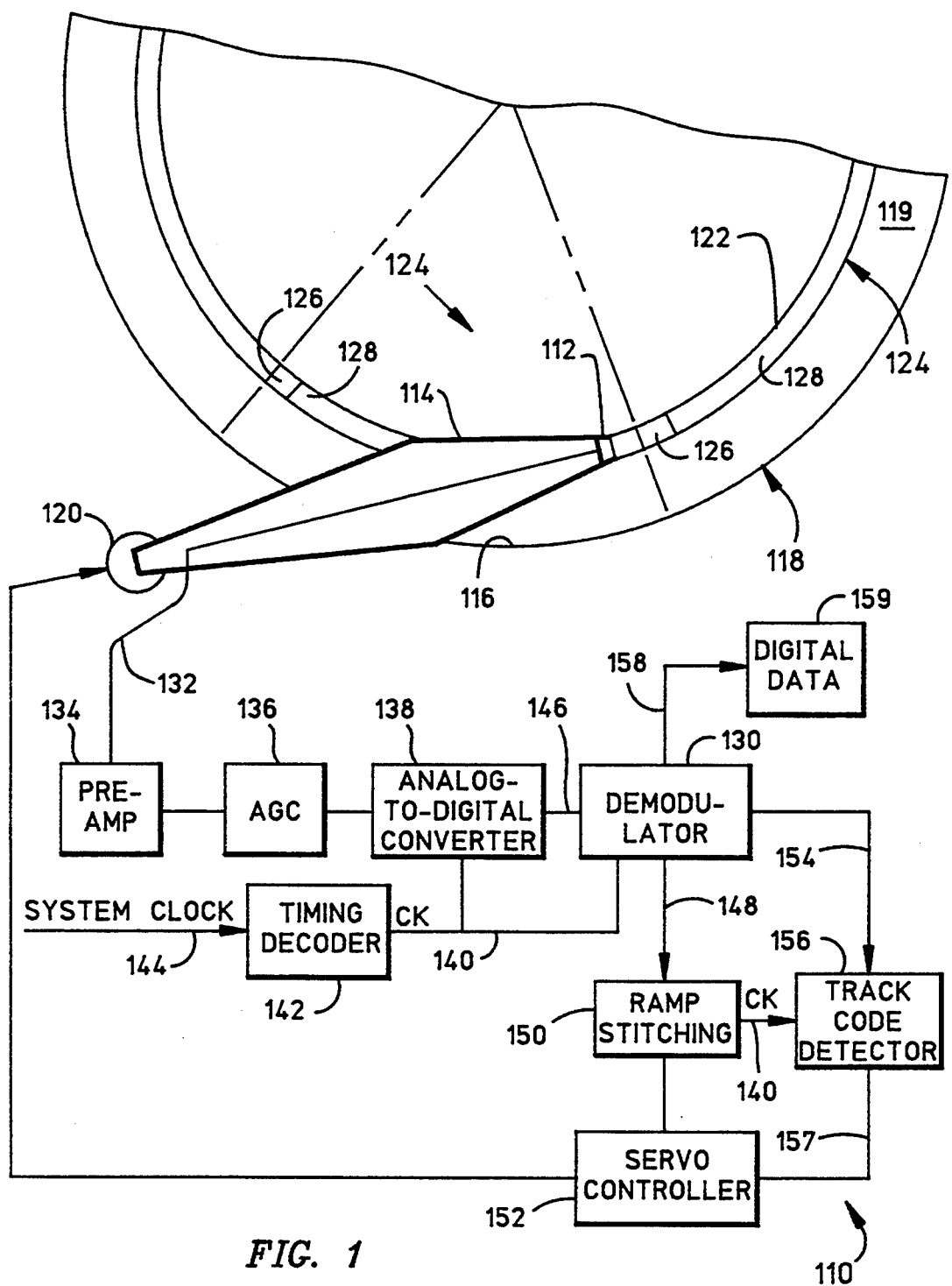
FIG. 1 is a block diagram of a disk drive system having a servo controller with an asynchronous, digital servo information demodulator and a track code detector constructed in accordance with the present invention.

Referring to FIG. 1, there is illustrated a position control system 110 of a sector servo data storage disk drive system 111 constructed in accordance with the present invention. The disk drive system includes a magnetic read/write head 112 mounted on a disk arm 114 that is moved across the surface 116 of a storage medium comprising a disk 118, on which is deposited a magnetic recording material 119, by a servo assembly 120. The read/write head detects changes in magnetic flux orientation of the magnetic recording material that are recorded in tracks across the disk. In FIG. 1, only one track 122 is shown for clarity. The read/write head acts as a transducer, generating a fluctuating electrical signal in response to the detected flux changes.

FIG. 1 diagrammatically shows that the track is divided into sectors 124 having a servo information field 126 followed by a data field 128. The control system 110 controls movement of the disk arm 114 across the disk to move the read/write head 112 from track to track and to maintain the read/write head centered over a desired track. As the read/write head moves across the disk surface 116, the read/write head reads track identification information recorded on the disk surface at the time of disk manufacture and provides it to a demodulator 130 that asynchronously demodulates the information. In particular, the demodulator generates a track address signal to determine the track address and a servo position error signal (PES) to keep the head centered on a track. In this way, the servo control system 110 substantially eliminates error in the demodulated track address information, benefits from sharing signal processing components with disk drive components for reading data from the digital data fields 128, does not require a phase lock loop circuit, and can effectively remove spurious artifacts from the demodulated track address information signal using digital techniques.

When the read/write head 112 reads track identification information from the track 122, the head produces a track identification information signal that is provided over a head output line 132 to a preamplifier 134. The preamplifier amplifies the track identification information signal and provides the amplified signal to an automatic gain control (AGC) 136 that adjusts the gain applied to the signal to maintain the signal amplitude within a range that is predetermined to simplify information processing, reduce noise, and improve system linearity. The amplified signal from the AGC 136 is provided to an analog-to-digital converter 138 that asynchronously converts the signal in accordance with a sampling clock signal CK received over a sampling clock line 140. The sampling clock signal CK is produced by a timing decoder 142 that receives a system clock signal over a system clock signal line 144. The digitized track identification information signal is provided over a converter output line 146 to the demodulator 130, which generates a track address code signal to determine the address of the track and produces a position error signal (PES) that indicates the direction and extent of servo movement required to maintain the read/write head 112 centered about a track 122. The PES is provided over a PES signal line 148 to a conventional ramp stitching block 150 and then over a signal line 151 to a servo controller 152 that generates control signals provided to the servo 120 to move the disk arm 114 and keep the read/write head 112 centered about the track 122. The track address code signal is provided over a track address signal line 154 to a track code detector 156, which provides the track address to the servo controller for determining the address of the track 122, and then over an address detector signal line 157 to the servo controller.

Preferably, the automatic gain control (AGC) 136, analog-to-digital converter 138, and demodulator 130 of the control system 110 are shared with the digital data detection channel. That is, the AGC, converter, and demodulator are used both for detecting the track identification information from the servo information field 126 of the track and the digital data from the data field 128 of the track. This reduces the number of components necessary for reading data from the disk and simplifies the overall construction of the control system. Thus, a digital data signal from the demodulator is provided over a digital data signal line 158 to digital data processing components 159.

The demodulator 130 preferably is of the overall design described in the related U.S. patent application identified above, entitled "Asynchronous Digital PES Demodulation Disk Drive Servo Control System" filed by Wayne Cheung, Chung C. Liu, and F. Edward Mueller, assigned to IBM Corporation. Thus, the demodulator preferably includes a squarer and finite impulse response filter with filter coefficients chosen to provide a harmonic notch Hilbert Transform filter function. In particular, some high density disk drives use read/write heads with magneto-resistive (MR) heads that produce second-order harmonics that the Hilbert Transform filter can effectively remove. The filter also can be tailored to remove other noise and harmonic contents that can cause PES and track code conversion errors due to sampling clock error and phase jitter. Because the demodulator can process the high frequency PES data, it follows that the track address data can be recorded on the disk at higher frequencies than can be accurately decoded by conventional track address data decoding systems. This is advantageous, for example, because higher frequency data takes less disk area to record and leaves more disk area for digital data.

Figure 2:
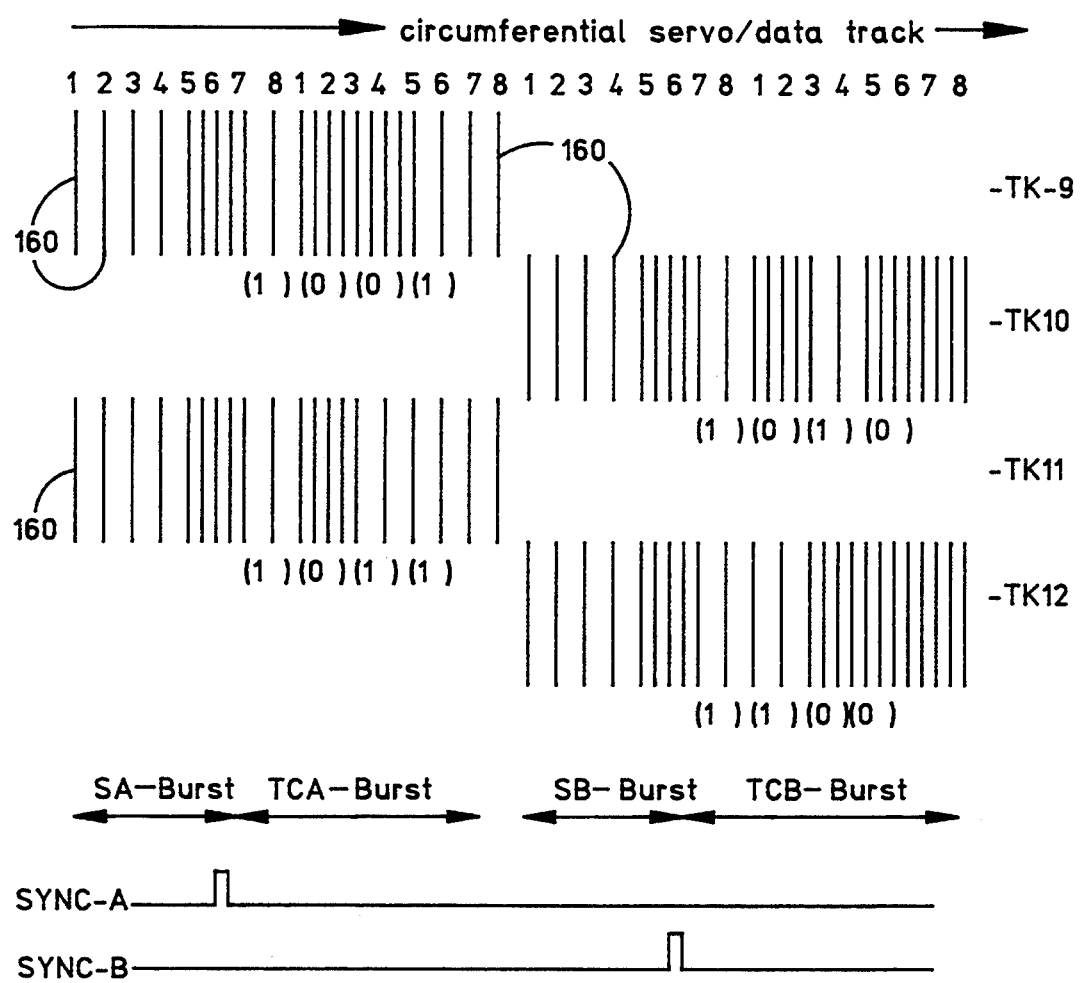
FIG. 2 is a representation of an asynchronous two-frequency track code recorded on the surface of the disk illustrated in FIG. 1.

In FIG. 2, the track address code patterns for four tracks labeled TK-9, TK-10, TK-11, and TK-12 are illustrated. The track address code patterns comprise bursts of magnetic flux transitions, represented by a vertical bar 160 that extend across the full width of a track in the disk radial direction. The transitions are arranged in alternate tracks with what will be referred to as an "A" burst section in one track and a "B" burst section in the next track. Each burst section has a synchronization burst sequence of transitions and a track code burst sequence of transitions. The synchronization burst and track code burst sequences are identified in the A burst section as an "SA" synchronization burst sequence and a "TCA" burst sequence, respectively. Similarly, the synchronization burst and track code burst sequences are identified in the B burst section as an "SB" synchronization burst sequence and a "TCB" burst sequence, respectively. Note that none of the burst transitions are aligned with transitions in an adjacent track, in the disk radial direction.

The synchronization burst sequence is used for generating synchronization pulses and for establishing the reference signal amplitude as an adaptive binary detection threshold, as described further below. The synchronization burst comprises several "one" patterns followed by a "zero" pattern. The track code burst follows the synchronization burst. As illustrated in FIG. 2, a "one" is encoded as "1010" and will result in a first frequency signal. A "zero" is encoded as "1111" and will result in a second frequency signal having a frequency twice that of the first signal. That is, a "one" comprises a transition (represented in FIG. 2 by a vertical bar) followed by the absence of a transition (a blank space) followed by another transition (a vertical bar) followed by the absence of a transition (a final blank space). A "zero" comprises a sequence of four transitions (represented in FIG. 2 by a sequence of four vertical bars in succession). In this way, a "zero" will have twice as many transitions as a "one" and therefore produces a track position signal having twice the frequency. The track code burst follows the synchronization burst. In accordance with the present invention, it is not necessary for the track code burst to be in Gray code.

Thus, in FIG. 2, the track address code pattern for the first track, TK-9, comprises a synchronization burst sequence of two "ones" comprising the first two pairs of transitions in the track (1-2 and 3-4) and a "zero" comprising the transitions associated with the fifth and sixth transitions (5-6) in the track. The transitions associated with the seventh and eighth transitions in the track (7-8) comprise a "1010" sequence and therefore define a numeral "one" whereas the transitions associated with the first two transitions in the next transition sequence (1-2 and 3-4) each define a "zero" numeral. Finally, the last "1010" sequence (5-6) defines the last "one" to comprise a binary number "1001" track code, or numeral nine, for TK-9. A final repeating "one" pattern constitutes the last-two (7-8) transitions in TK-9 to identify an "A" burst. Similarly, the track address code pattern for the second track, TK-10, can be read as the binary number "1010" comprising the numeral ten, followed by a final repeating "zero" pattern to identify a "B" burst. The synchronization pulses for the A and B bursts are illustrated at the bottom of FIG. 2 to assist in delineating the synchronization bursts and the track code bursts.

Because the track code transition bursts are encoded as "ones" and "zeroes" such that the transitions comprising the "zeroes" have twice the frequency of the transitions comprising the "ones," the "zero" signal can be regarded as a second order harmonic of the "one" signal. As noted above, the demodulator 130 includes a digital filter with Hilbert Transform coefficients to remove second order harmonics. Therefore, the filter output will necessarily produce a track code signal with the signal portion comprising the "one" having a higher amplitude, being the fundamental frequency, and the portion comprising the "zero" having a lower amplitude. Thus, the track code detector 156 can detect the track code data by using: a digital filter that can be used in conjunction with the demodulation of the PES data. In this way, logic circuitry can be shared among the digital data channel, the PES data channel, and the track code data channel. This sharing of components reduces the size, cost, and complexity of the circuitry.

Figure 3:
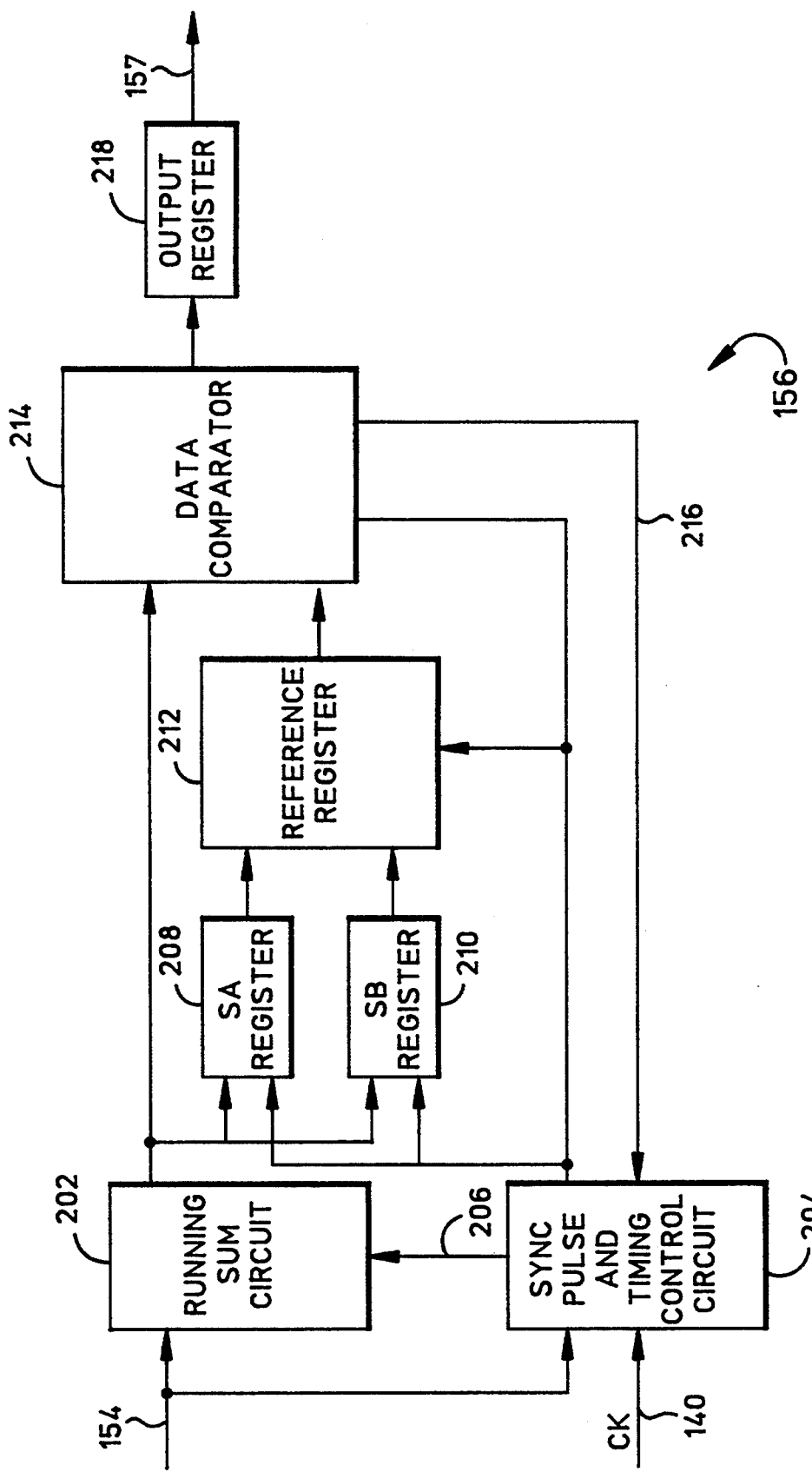
FIG. 3 is a block diagram of the track code detector illustrated in FIG. 1.

The detection and demodulation of the track code will be explained with reference to FIG. 3, which is a block diagram of the track code detector 156 illustrated in FIG. 1. As noted above, the track code detector receives the track address signal over the track address signal line 154. In the track code detector, the track address signal is provided to a running sum circuit 202 and synchronization pulse and timing counter circuit 204. The track address signal is provided in the sequence of a sector marker pulse followed by an "A" section "SA" synchronization burst sequence, an "A" section "TCA" track code burst sequence, followed by a "B" section "SB" synchronization burst sequence and a "B" section "TCB" track code burst sequence. The sampling clock signal CK frequency is selected to be four times the "zero" track code pattern transition frequency and eight times the "one" track code pattern transition frequency. The sector marker signal initializes clock pulse CK counting by the counter 204 to detect either the "SA" synchronization burst or the "SB" synchronization burst. The counter 204 validates a synchronization pulse by detecting the "one" pattern burst followed by a "zero" pattern burst at the end of a synchronization burst, as described above. A synchronization pulse is received by the running sum circuit from the counter circuit 204 over a signal line 206 and indicates the beginning of a track code detection time interval.

The running sum circuit 202 and the synchronization pulse and timing counter circuit 204 cause the "SA" and "SB" synchronization burst signals and "TCA" and "TCB" track code signals to be stored in an SA register 208 and SB register 210, respectively, based on whether an "A" burst signal is detected or a "B" burst signal is detected. For the "SA" and "SB" burst signals, the running sum circuit adds four or more consecutive data points to use as synchronization amplitude reference data, wherein the reference data is used as a track code binary detection threshold. For "TCA" and "TCB" track code signals, the running sum circuit adds four or more consecutive data points to produce moving average data points for track code detection. This reduces noise in the signal terms. At each respective clock time, depending on whether an "A" burst or "B" burst signal is detected, the contents of either the SA register or the SB register are provided to a reference register 212. The reference register is updated with every servo sector of the disk as a comparison reference value for the "SA" and "SB" signals. That is, for a servo sector, an "SA" or "SB" signal is not valid if it does not match the reference value in the reference register 212.

A data comparator 214 in the track code detector 156 includes digital data correlation and comparison circuits to validate synchronization pulses generated by the synchronization pulse and timing counter circuit 204, to detect the track code binary number data, and generate a select signal to select track code A or B output for the servo controller 152. To validate synchronization pulses, the comparator detects a high-amplitude-to-low-amplitude ("one" pattern to "zero" pattern) transition to generate a "sync-burst-low" signal that is provided over a sync burst signal line 216 to the synchronization pulse and timing control circuit 204. The "sync-burst-low" signal is high when the incoming signal from the running sum circuit 202 is lower than the previous running sum signal by one-half and remains high for two CK clock cycles. The signal otherwise is low. At off-track positions of the read/write head, the track code detected from two burst sections A and B can both be valid. Only one track code, however, is produced as output, after a comparison of the detected track code data. In the preferred embodiment, the higher amplitude signal is selected. To detect track code data, the comparator compares the data points from the running sum circuit with the reference value stored in the reference register 212 and produces a "Track-Code-A" signal if the comparison indicates a match with the "TCA" pattern and produces a "Track-Code-B" signal is the comparison indicates a match with the "TCB" pattern. Finally, the comparator generates a "Select-A" signal that is high if the track code "TCA" is indicated or low if the track code "TCB" is indicated by the comparison. That is, the "A" burst data is indicated if the earlier-read TCA signal is greater than the TCB signal. Otherwise, the more recently read TCB signal is the proper track data to output. The output is provided to a track code output register 218 and is provided over the track code detector output line 158 to the servo controller 152 (FIG. 1).

Figure 4:
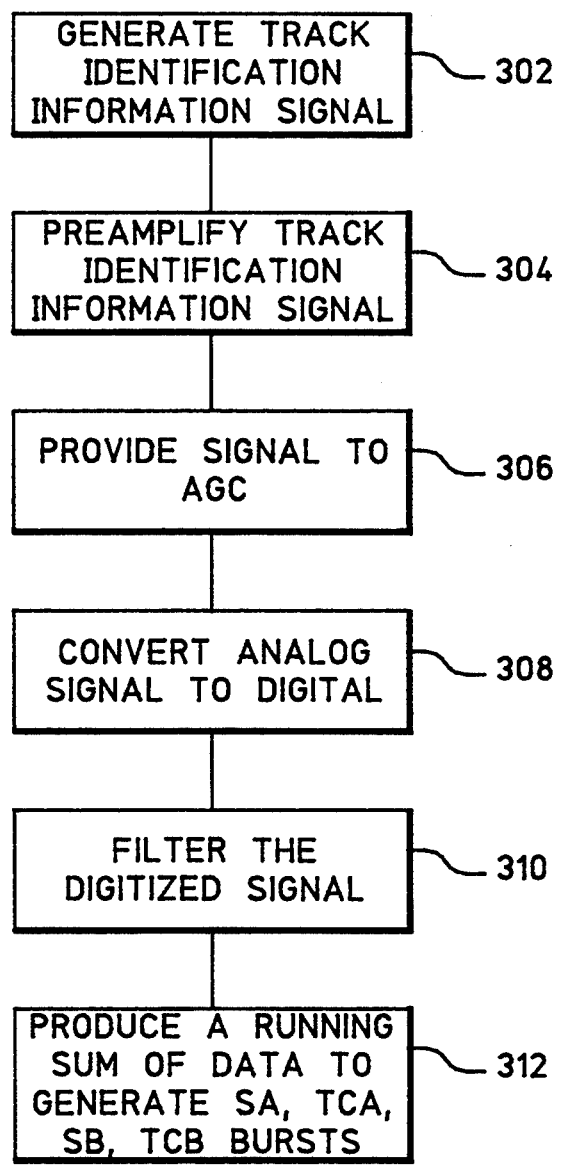
FIGS. 4 and 5 are flow diagrams of the steps performed by the disk drive servo control system illustrated in FIG. 1.

FIG. 4 is a flow diagram of the steps carried out by the control system 110 constructed in accordance with the, present invention. The flow diagram steps are carried out by a combination of hardware circuits or microprocessor firmware and circuitry in the control system. The initial step illustrated by the first flow diagram box 302 is to detect the magnetic flux transitions recorded in the surface of the disk and generate a track identification information signal. The next step at box 304 is to preamplify the signal, followed by conditioning of the signal with the automatic gain control circuit at the flow diagram box numbered 306. At the flow diagram box numbered 308, the system next converts the analog track information signal to a digital form using the analog-to-digital converter using asynchronous sampling with the sample clock signal CK. At the box numbered 310, the system next processes the digitized data with the squarer and harmonic notch Hilbert Transform filter. As described above, these steps 302 through 310 can all be performed by components that are shared between the digital data, PES data, and track code data channels for increased efficiency and reduced cost, complexity, and size. The next step performed by the control system at step 312 is to produce a running sum of four consecutive data points from the filtered signal for detecting the "SA", "SB", "TCA", and "TCB" burst sequences described above. This step is performed by the running sum circuit of the track code detector, whose further operation steps are described in greater detail in FIG. 5.

Figure 5:
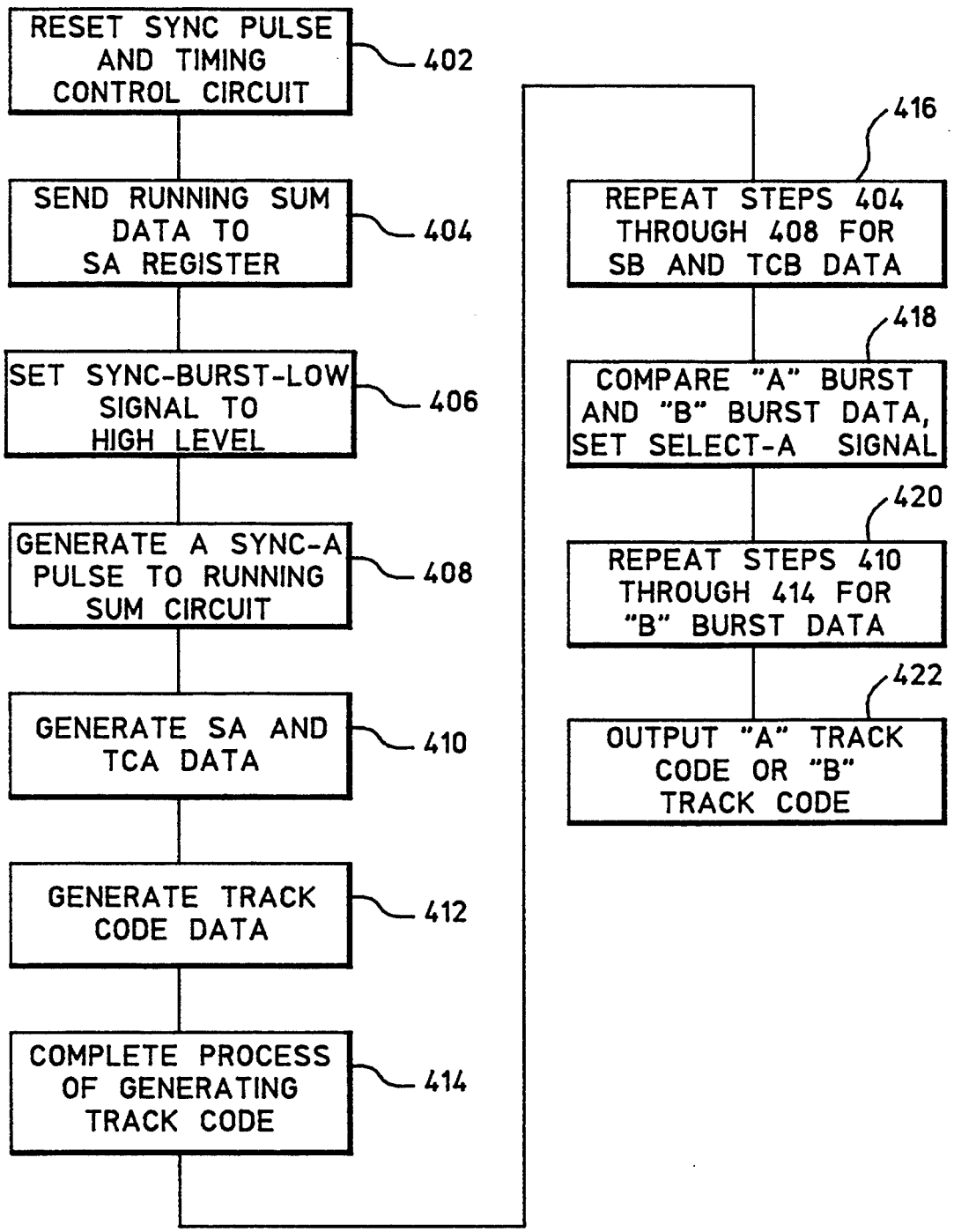

FIG. 5 is a flow diagram of the steps carried out by the track code detector of the control system 110 constructed in accordance with the present invention. The flow diagram steps are carried out by a combination of logic circuits or microprocessor firmware and circuitry in the control system. First, at the flow diagram box numbered 402, the synchronization pulse and timing counter circuit is reset by a sector marker pulse, which indicates the beginning of a servo sector. The detection of the "SA", "SB", "TCA", and "TCB" burst patterns are commenced, in accordance with the steps described in conjunction with FIG. 4. Assuming that the "A" burst data is received and processed first, at the flow diagram box numbered 404, the synchronization pulse and timing counter circuit generates an SA strobe signal to latch the running sum data from the running sum circuit to the SA register. At the flow diagram box numbered 406, the data comparator detects the sync burst amplitude transition and sets the "sync-burst-low" signal to a high value to validate an SA pulse. As a result, the running sum circuit generates an "SA" pulse from the input data at the flow diagram box numbered 408. Next, at box 410, the "SA" and "TCA" data is processed and provided to the SA register and reference register by the running sum circuit.

At the flow diagram box numbered 412, the data comparator performs the "TCA" data conversion by comparing the running sum data and reference register data to generate the track code number data and provides it to the output register. Finally, the "TCA" conversion process is completed at the box numbered 414 in response to a strobe pulse signal generated by the synchronization pulse and timing counter circuit to terminate the process. At the flow diagram box numbered 416, the steps indicated by the boxes numbered 404 through 408 are repeated, this time for the "B" burst data. Thus, the "SB" data is saved in the reference register, the running sum data is latched to the SB register, and the appropriate strobe pulses and processing steps are performed for the "B" burst data.

At the flow diagram box numbered 418, the comparator compares the SB data and SA data and sets the "Select-A" signal to high if the "TCA" burst data is greater than the "TCB" burst data. The "Select-A" signal is set low otherwise. At the flow diagram box numbered 420, the steps indicated by the boxes numbered 410 through 414 are repeated, this time for the "B" burst data. Finally, at the flow diagram box numbered 422, the track code number is output from the output register, either as the "A" burst pattern value or the "B" burst pattern value, in accordance with the "Select-A" signal level.

Although the disk drive position control system of the preferred embodiment has been described with respect to a sector servo disk drive, the principles of the invention also can be applied to a dedicated servo control system. The disk drive servo control system described above has wide application for data storage devices and uses a digital asynchronous track position demodulator to detect a quadrature track code that comprises a multi-frequency track address code. The digital demodulator advantageously permits the servo control system to share signal processing components with the digital data channel and PES data channel processing system and eliminates the need for additional components, such as a phase-lock-loop, needed for synchronous detection of track address data. The multi-frequency track address code permits track address data to be recorded at higher frequencies, reducing the disk area needed for track address information.

The present invention has been described above in terms of a presently preferred embodiment so that an understanding of the present invention can be conveyed. There are, however, many configurations for storage devices and disk controllers not specifically described herein but with which the present invention is applicable. The present invention should therefore not be seen as limited to the particular embodiment described herein, but rather, it should be understood that the present invention has wide applicability with respect to storage devices and disk controllers generally. All modifications, variations, or equivalent arrangements that are within the scope of the attached claims should therefore be considered to be within the scope of the invention.

We claim:

1. A disk drive having:
   a magnetic storage media disk with a magnetic recording material deposited with respect to a surface of the disk, on which is recorded a plurality of data tracks encoded with asynchronous track identification information burst patterns, PES information, and digital data;
   a magnetic head for transducing the asynchronous track identification information burst patterns and producing a track identification information signal; and
   a disk head controller that moves the magnetic head relative to the surface of the magnetic storage media disk in response to the asynchronous track identification information burst patterns, PES information, and digital data; wherein:
   the asynchronous track identification information burst patterns comprise an asynchronous, multi-frequency binary track address code having burst pattern transitions oriented across the data tracks in a disk radial direction such that a binary zero code is comprised of a burst pattern having a first frequency and a binary one code is comprised of a burst pattern having a second frequency different from the first and such that no transitions between adjacent tracks of the disk are aligned in the disk radial direction.

2. A disk drive as defined in claim 1, wherein the burst pattern transitions extend completely across the width of a track.

3. A disk drive as defined in claim 1, wherein the first frequency burst pattern is twice the frequency of the second burst pattern frequency.

4. A disk drive as defined in claim 1, further including a demodulator that receives the track identification information signal from the magnetic head and includes a signal squarer and a digital finite impulse response filter having filter coefficients that provide a harmonic notch Hilbert Transform filter function applied to the track identification information signal to produce a filtered information signal.

5. A disk drive as defined in claim 4, wherein the digital filter is shared with the PES data channel and digital data channel processing of the disk drive.

6. A disk drive as defined in claim 4, further including:
   a servo controller that controls movement of the disk head; and
   a track code detector that receives a track identification information signal from the digital filter and generates a track code output signal that is provided to the servo controller.

7. A disk drive having:
   a magnetic storage media disk with a magnetic recording material deposited with respect to a surface of the disk, on which is recorded a plurality of data tracks encoded with asynchronous track identification information burst patterns, PES information, and digital data;
   a magnetic head for transducing the asynchronous track identification information burst patterns and producing a track identification information signal; and
   a disk head controller that moves the magnetic head relative to the surface of the magnetic storage media disk in response to the asynchronous track identification information burst patterns, PES information, and digital data;

a demodulator that receives the track identification information signal from the magnetic head and includes a signal squarer and a digital finite impulse response filter having filter coefficients that provide a harmonic notch Hilbert Transform filter function applied to the track identification information signal to produce a filtered information signal;

a servo controller that controls movement of the disk head; and a track code detector that receives the filtered information signal from the digital filter and generates a track code output signal that is provided to the servo controller;

wherein the asynchronous track identification information burst patterns comprise an asynchronous, multi-frequency binary track address code having burst pattern transitions such that a binary zero code is comprised of a burst pattern having a first frequency and a binary one code is comprised of a burst pattern having a second frequency different from the first and such that no transitions between adjacent tracks of the disk are aligned in a disk radial direction; and wherein the track code detector includes a running sum circuit that adds a predetermined number of track identification signal samples to generate a running sum signal.

8. A disk drive as defined in claim 7, wherein the track identification information burst pattern comprises a "zero" burst pattern and a "one" burst pattern that are recorded in alternate tracks of the disk.

9. A disk drive as defined in claim 8, wherein the track code detector includes a reference register that adaptively stores reference data from the track identification information burst pattern that identifies a remaining portion of the track identification information burst pattern as comprising either a "zero" burst pattern or a "one" burst pattern.

10. A disk drive as defined in claim 9, wherein the track code detector includes a comparator that compares the reference data and the remaining portion of the track identification information burst pattern and determines if the pattern is a "zero" pattern or a "one" pattern.

11. A disk head position control system for use in a disk drive having a magnetic storage media disk with a magnetic recording material deposited with respect to a surface of the disk, on which is recorded a plurality of data tracks encoded with track identification information burst patterns, PES information, and digital data, the disk further having a magnetic head for transducing the track identification information burst patterns and producing a track identification information signal, the position control system comprising:

a disk head controller that moves the disk magnetic head relative to the surface of the magnetic storage media disk in response to the track identification information burst patterns, PES information, and digital data; and a track identification information burst pattern that includes an asynchronous, multi-frequency track address code having burst pattern transitions oriented across the data tracks in a disk radial direction such that a binary zero code is comprised of a burst pattern having a first frequency and a binary one code is comprised of a burst pattern having a second frequency different from the first and such that no transitions between adjacent tracks are aligned in the disk radial direction.

12. A disk head position control system as defined in claim 11, wherein the burst pattern transitions extend completely across the width of a track.

13. A disk head position control system as defined in claim 11, wherein the first frequency burst pattern is twice the frequency of the second burst pattern frequency.

14. A disk head position control system as defined in claim 11, wherein the system includes a demodulator that receives the track identification information signal from the magnetic head and includes a signal squarer and a digital finite impulse response filter having filter coefficients that provide a harmonic notch Hilbert Transform filter function applied to the track identification information signal.

15. A disk head position control system as defined in claim 14, wherein the digital filter is shared with the PES data channel and digital data channel processing of the disk drive.

16. A disk head position control system as defined in claim 14, wherein the system includes:

a servo controller that controls movement of the disk head; and a track code detector that receives a track identification information signal from the digital filter and generates a track code output signal that is provided to the servo controller.

17. A disk head position control system for use in a disk drive having a magnetic storage media disk with a magnetic recording material deposited with respect to a surface of the disk, on which is recorded a plurality of data tracks encoded with track identification information burst patterns, PES information, and digital data, the disk further having a magnetic head for transducing the track identification information burst patterns and producing a track identification information signal, the position control system comprising:

a disk head controller that moves the disk magnetic head relative to the surface of the magnetic storage media disk in response to the track identification information burst patterns, PES information, and digital data;

a track identification information burst pattern that includes an asynchronous, multi-frequency track address code having a burst pattern transitions such that a binary zero code is comprised of a burst pattern having a first frequency and a binary one code is comprised of a burst pattern having a second frequency different from the first and such that no transitions between adjacent tracks are aligned in the disk radial direction;

a demodulator that receives the track identification information signal from the magnetic head and includes a signal squarer and a digital finite impulse response filter having filter coefficients that provide a harmonic notch Hilbert Transform filter function applied to the track identification information signal to produce a filtered information signal;

a servo controller that controls movement of the disk head; and a track code detector that receives the filtered information signal from the digital filter and generates a track code output signal that is provided to the servo controller;

wherein the track code detector includes a running sum circuit that adds a predetermined number of track identification signal samples to generate a running sum signal.

18. A disk head position control system as defined in claim 17, wherein the track identification information burst pattern comprises a zero burst pattern and a "one" burst pattern that are recorded in alternate tracks of the disk.

19. A disk head position control system as defined in claim 18, wherein the track code detector includes a reference register that stores reference data from the track identification information burst pattern that identifies a remaining portion of the track identification information burst pattern as comprising either a "zero" burst pattern or a "one" burst pattern.

20. A disk head position control system as defined in claim 19, wherein the track code detector includes a comparator that compares the adaptive reference data and the remaining portion of the track identification information burst pattern and determines if the pattern is a "zero" pattern or a "one" pattern.

21. A method of detecting a track code address burst pattern that is recorded in tracks of a disk, along with PES data and digital data in a sector servo format, the method comprising the steps of:

detecting the burst pattern magnetic flux transitions recorded in the surface of the disk and generating an analog track identification information signal;

converting the analog track identification information signal to a digital form;

filtering the digitized data with a digital squarer and harmonic notch Hilbert Transform filter;

generating a running sum of four consecutive data points from the filtered signal and generating an SA synchronization burst sequence and a TCA track code burst pattern sequence;

storing an SA synchronization burst pattern sequence reference value;

comparing the TCA track code burst pattern sequence with the stored reference value and converting the TCA track code burst pattern sequence and producing a TCA track code address binary number;

generating a running sum of four consecutive data points from the filtered signal and generating an SB synchronization burst sequence and a TCB track code burst pattern sequence;

storing an SB synchronization burst pattern sequence reference value;

comparing the TCB track code burst pattern sequence with the stored reference value and converting the TCB track code burst pattern sequence and producing a TCB track code address binary number;

setting a Select-A signal to high if the TCA track code burst pattern amplitude is greater than the TCB track code burst pattern amplitude and setting the Select-A signal to low otherwise;

generating an output signal comprising the TCA track code address binary number if the Select-A signal is high and otherwise generating an output signal comprising the TCB track code address binary number.

22. The method defined in claim 21, wherein the step of converting the analog track identification information signal to a digital form comprises using an analog-to-digital converter having asynchronous sampling in accordance with a sample clock signal CK.

* * * * *

UNITED STATES PATENT AND TRADEMARK OFFICE
CERTIFICATE OF CORRECTION

PATENT NO. : 5,442,498

DATED : August 15, 1995

INVENTOR(S) : Cheung et al

It is certified that error appears in the above-indentified patent and that said Letters Patent is hereby corrected as shown below:

Column 13, line 7, change "zero" to --"zero"--.

Signed and Sealed this

Twenty-fourth Day of October, 1995

Attest:

BRUCE LEHMAN

Attesting Officer      Commissioner of Patents and Trademarks